United States Patent [19]

Pratt et al.

[11] Patent Number: 5,579,102
[45] Date of Patent: *Nov. 26, 1996

[54] TRANSMITTER AND RECEIVER UNITS FOR SPATIAL POSITION MEASUREMENT SYSTEM

[75] Inventors: Timothy Pratt; Andrew W. Dornbusch; Yvan J. Beliveau; Eric J. Lundberg, all of Blacksburg, Va.; Michael H. Sweeney, Commerce Township, Mich.

[73] Assignee: Spatial Positioning Systems, Inc., Blacksburg, Va.

[*] Notice: The term of this patent shall not extend beyond the expiration date of Pat. No. 5,100,229.

[21] Appl. No.: 539,379

[22] Filed: Oct. 5, 1995

Related U.S. Application Data

[63] Continuation of Ser. No. 123,891, Oct. 5, 1995, Pat. No. 5,461,473, which is a continuation-in-part of Ser. No. 714,891, Jun. 17, 1991, Pat. No. 5,247,487, and a continuation-in-part of Ser. No. 755,780, Sep. 6, 1991, Pat. No. 5,294,970.

[51] Int. Cl.$^6$ .............................. G01C 3/00; G01B 11/26; E02F 3/76; G02B 3/02
[52] U.S. Cl. .................. 356/3.12; 172/4.5; 356/3.09; 356/4.08; 356/141.3; 356/141.5; 359/709; 359/712
[58] Field of Search ................... 356/4.08, 3.09, 356/3.12, 141.3, 141.4; 359/709, 712; 33/293; 250/206.1, 208.6; 172/4.5

[56] References Cited

U.S. PATENT DOCUMENTS

| | | |
|---|---|---|
| 3,687,556 | 8/1972 | Price et al. . |
| 4,240,208 | 12/1980 | Pehrson .................................. 33/293 |
| 4,677,555 | 6/1987 | Goyet ..................................... 364/424 |
| 4,700,301 | 10/1987 | Dyke ...................................... 364/424 |
| 4,791,297 | 12/1988 | Savoca et al. . |
| 4,820,041 | 4/1989 | Davidson et al. ......................... 365/1 |
| 4,912,643 | 3/1990 | Beirxe ................................... 364/449 |
| 4,943,158 | 7/1990 | Pertl et al. . |
| 5,247,487 | 9/1993 | Beliveau et al. . |
| 5,367,399 | 11/1994 | Kramer ................................. 359/206 |

FOREIGN PATENT DOCUMENTS

| | | |
|---|---|---|
| 2584197 | 1/1987 | France . |
| 2640760 | 1/1990 | France . |
| 2152320 | 7/1985 | United Kingdom . |
| 2173369 | 10/1986 | United Kingdom . |

OTHER PUBLICATIONS

"A Beacon Navigation Method for Autonomous Vehicles", Clare D. McGillem & Theodore S. Rappaport IEEE Transactions of Vehicular Technology, vol. 38, No. 3, Aug. 1989.

Primary Examiner—Stephen C. Buczinski
Attorney, Agent, or Firm—Rossi & Associates

[57] ABSTRACT

Improved transmitter and receiver units for use in spatial measurement system that are easy and inexpensive to manufacture while providing a high degree of reliability are disclosed. Specifically, the laser transmitter includes a laser emitter, a bearing/motor assembly coupled to the laser emitter, the bearing/motor assembly including a rotatable hollow spindle shaft through which a laser beam generated by the laser emitter passes and a motor for driving the spindle shaft, a prism assembly coupled to the spindle shaft, wherein the prism assembly divides the laser beam generated by the laser emitter into a pair of fanned laser beams, and reflecting means for reflecting the fanned laser beams generated by the prism assembly as counter-rotating fanned laser beams. The receiver unit preferably includes at least one optical receiver coupled to an extension member, a processing unit coupled to the optical receiver, and a receiver interface coupled to the processing unit.

13 Claims, 9 Drawing Sheets

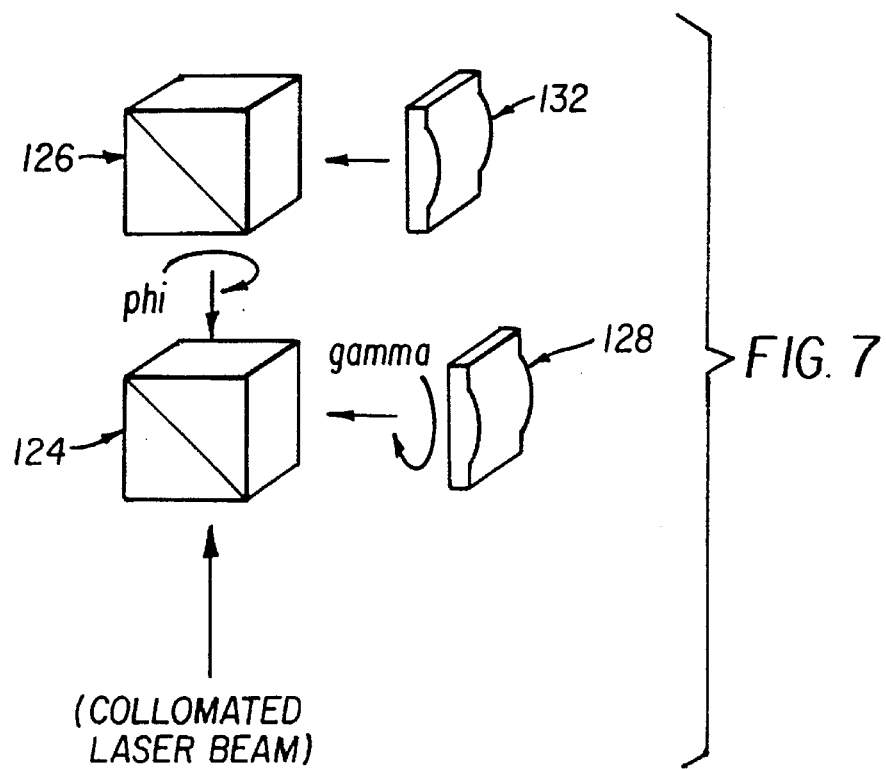
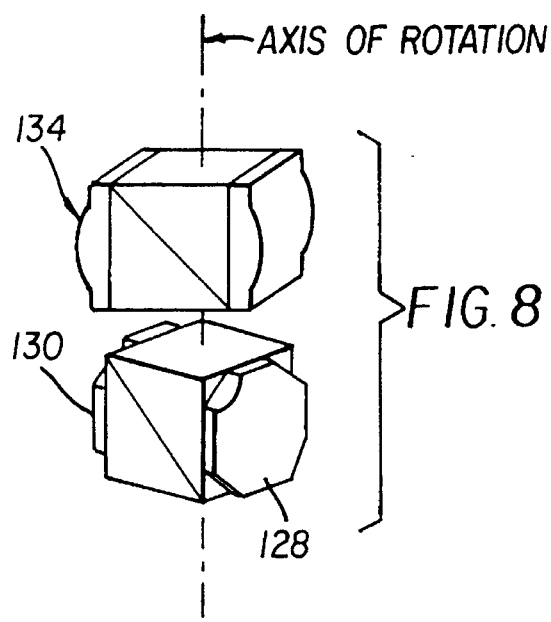
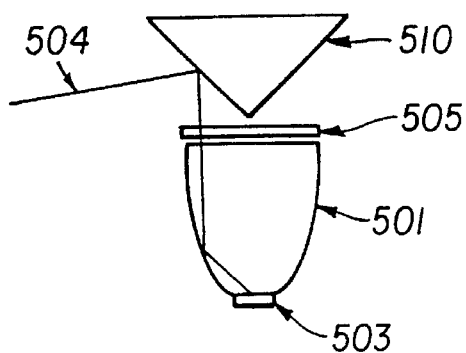
FIG. 7
FIG. 8
FIG. 9

TRANSMITTER AND RECEIVER UNITS FOR SPATIAL POSITION MEASUREMENT SYSTEM

CROSS-REFERENCE TO RELATED APPLICATIONS

This is a Continuation of application Ser. No. 08/123,891 filed Oct. 5, 1995 which in turn is a continuation-in-part of U.S. patent application Ser. No. 07/714,891, filed Jun. 17, 1991, entitled "Spatial Measurement Recovery System" by Beliveau et al., Notice of Allowance received Mar. 23, 1993, and a continuation-in-part of U.S. patent application Ser. No. 07/755,780, filed Sep. 6, 1991, entitled "Spatial Positioning System" by Dornbusch et al., both of which are incorporated herein by reference, now U.S. Pat. Nos. 5,461,473, 5,247,487 and 5,294,970, respectively.

FIELD OF INVENTION

The present invention relates to a spatial position measurement system and, more particularly, to a spatial position measurement system which provides three-dimensional position measurement information of an object using at fixed transmitter units and at least one portable position sensor unit.

BACKGROUND OF INVENTION

Computer Aided Design and Drafting (CADD) has become a standard design tool for manipulating and recording design information in many industries including construction and manufacturing. CADD models are used to accurately depict the position, shape and orientation of objects, and their relationship to other objects, within a defined environment. The ability to model the objects with the defined environment greatly reduces the amount of engineering effort that must be expended in devising a working design that can be efficiently and economically implemented.

U.S. Pat. Nos. 5,100,229 and 5,110,202, the contents of both of which are incorporated herein by reference, for example, describe systems and methods in which a CADD model is used in connection with a portable position sensor and at least one referent station to identify specific points within an environment. The position information can be used to control construction equipment or model different variations of proposed designs based on the actual measured environment. U.S. Patent application Ser. No. 07/714,891 further describes a system for gathering spatial and descriptive data on existing structural elements within an environment that can be used to build CADD models. In order to be commercially viable, however, the position measurement systems described above must be manufactured in an efficient an economical manner that permits their implementation on a wide scale with a high degree of reliability.

It is an object of the invention to provide improvements in the transmitter units and receiver units of the basic systems described above, in order to make the systems easier and less expensive to manufacture while maintaining a high degree of reliability.

SUMMARY OF INVENTION

The invention provides improved transmitter and receiver units for use in spatial measurement system that are easy and inexpensive to manufacture while providing a high degree of reliability. Specifically, a laser transmitter unit for a spatial measurement system is disclosed that includes a laser emitter, a bearing/motor assembly coupled to the laser emitter, the bearing/motor assembly including a rotatable hollow spindle shaft through which a laser beam generated by the laser emitter passes and a motor for driving the spindle shaft, a prism assembly coupled to the spindle shaft, wherein the prism assembly divides the laser beam generated by the laser emitter into a pair of fanned laser beams, and reflecting means for reflecting the fanned laser beams generated by the prism assembly as counter-rotating fanned laser beams. The receiver unit preferably includes at least one optical receiver coupled to an extension member, a processing unit coupled to the optical receiver, and a receiver interface coupled to the processing unit.

BRIEF DESCRIPTION OF DRAWINGS

The invention will be described in greater detail with reference to the accompanying drawings, wherein:

FIG. 7 is an illustration of prism cubes utilized in the prism assembly shown in FIG. 6;

FIG. 8 is an illustration of the prism cubes shown in FIG. 7 with cylindrical lens and dummy lens bonded thereto;

FIG. 9 is a schematic diagram of a first embodiment of an optical receiver;

DETAILED DESCRIPTION OF THE PREFERRED EMBODIMENTS

Figure 1:
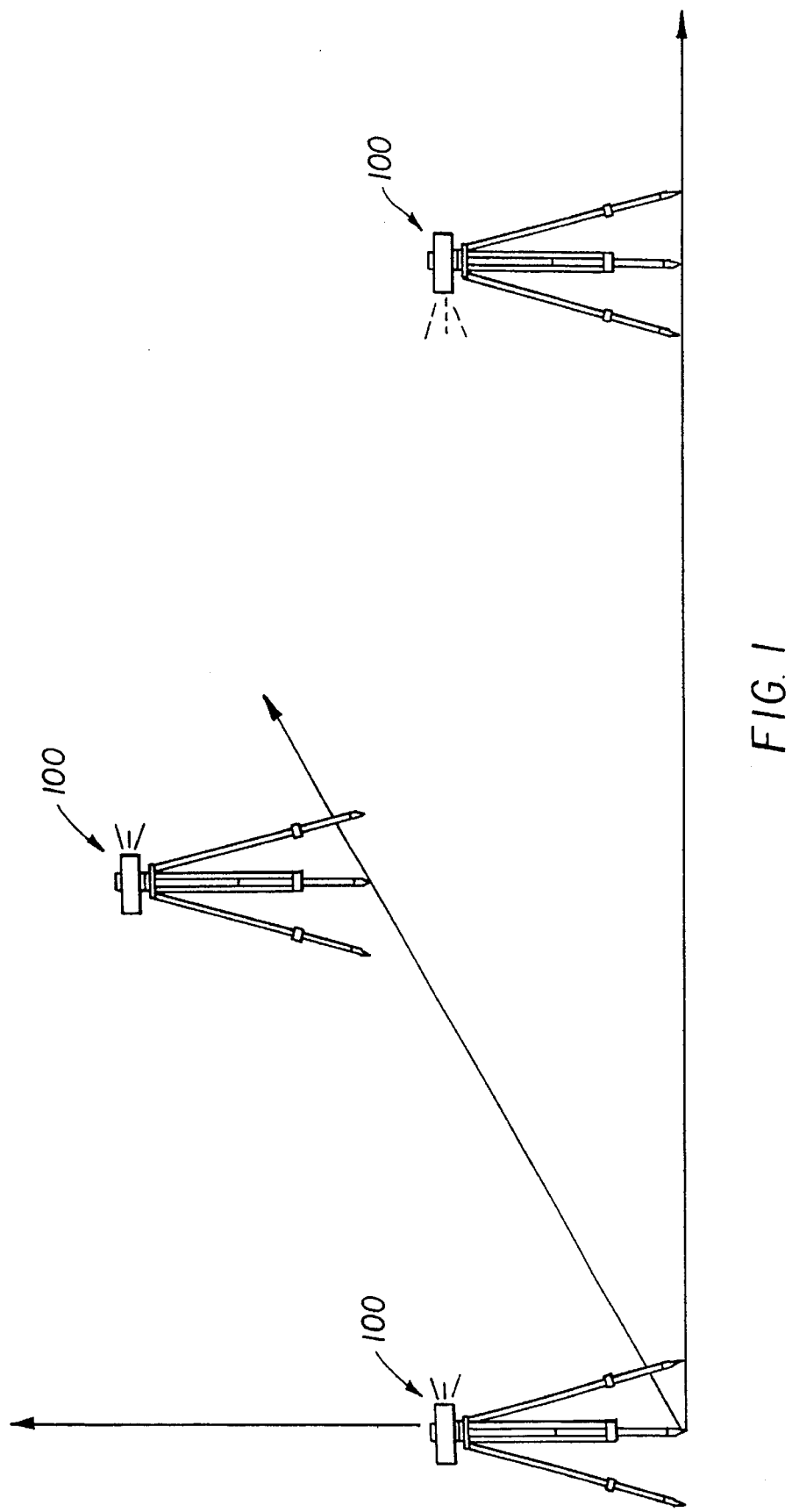
FIG. 1 is a drawing illustrating the use of at least two a laser transmitter units to scan an environment to be modeled.
Figure 2:
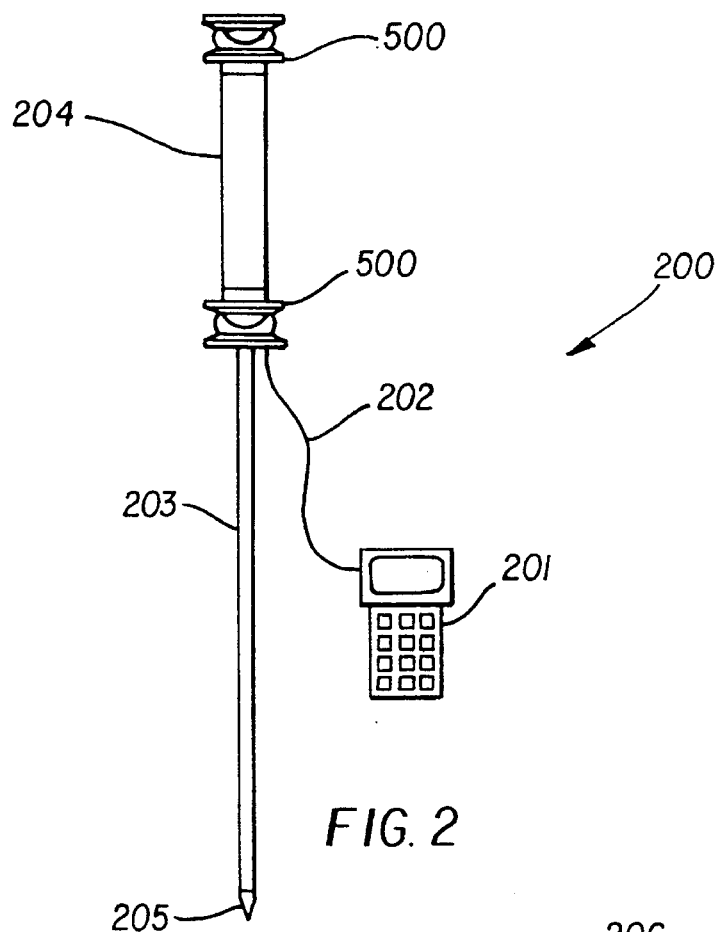
FIG. 2 is a drawing of a first embodiment of a portable receiver unit.
Figure 3:
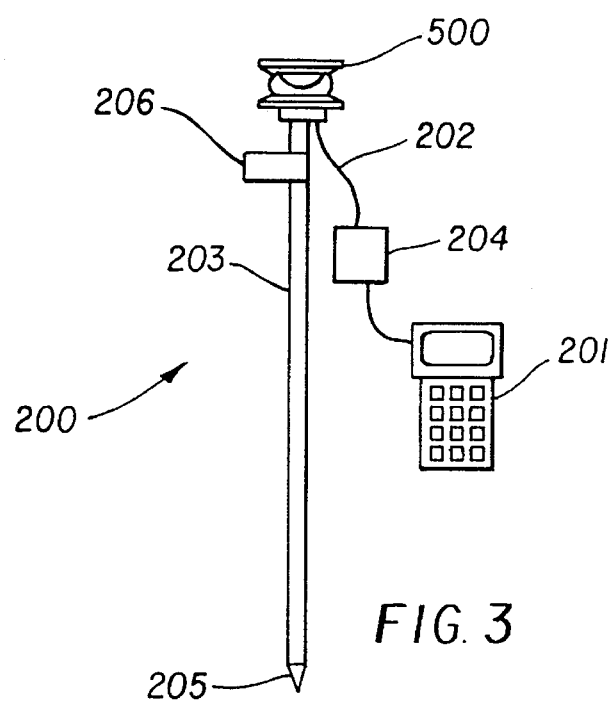
FIG. 3 is a drawing of a second embodiment of a portable receiver unit.

A spatial position measurement system, in accordance with the invention, preferably includes a minimum of two laser transmitter units 100 mounted on tripods and arranged at points in an environment to be modeled as shown in FIG. 1. At least one portable receiver unit 200, of a type shown in FIGS. 2 or 3, is used to determine the location of particular points or structures within the environment. Each laser transmitter unit 100, which constitutes a fixed referent station, produces counter-rotating fanned laser beams, which sweep over an angle (A) shown in a top view of a laser transmitter unit 100 illustrated in FIG. 4, at a constant angular velocity. The portable receiver unit 200 generates position data based on the detection of the fanned laser beams emitted from the laser transmitter units 100. The position data generated by the portable receiver unit 200 is used to model an environment as described in U.S. patent application Ser. No. 07/714,891, the contents of which has been incorporated by reference.

Figure 4:
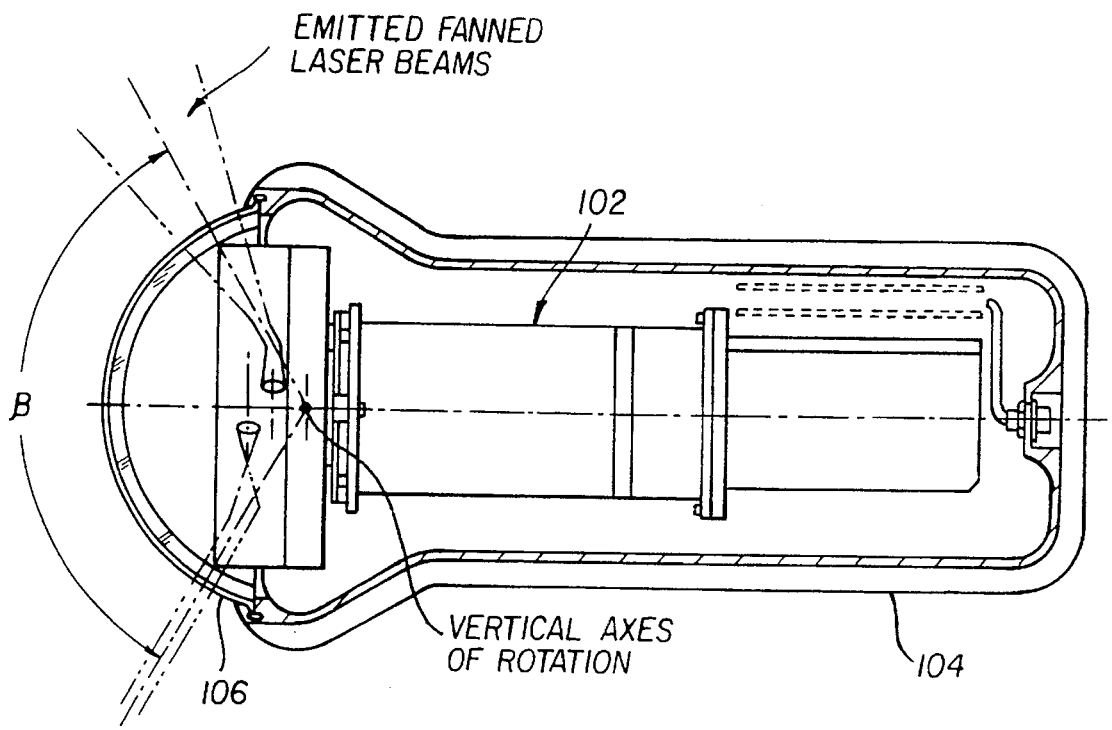
FIG. 4 is a top cut-a-way view of the laser transmitter unit illustrated in FIG. 1.
Figure 5:
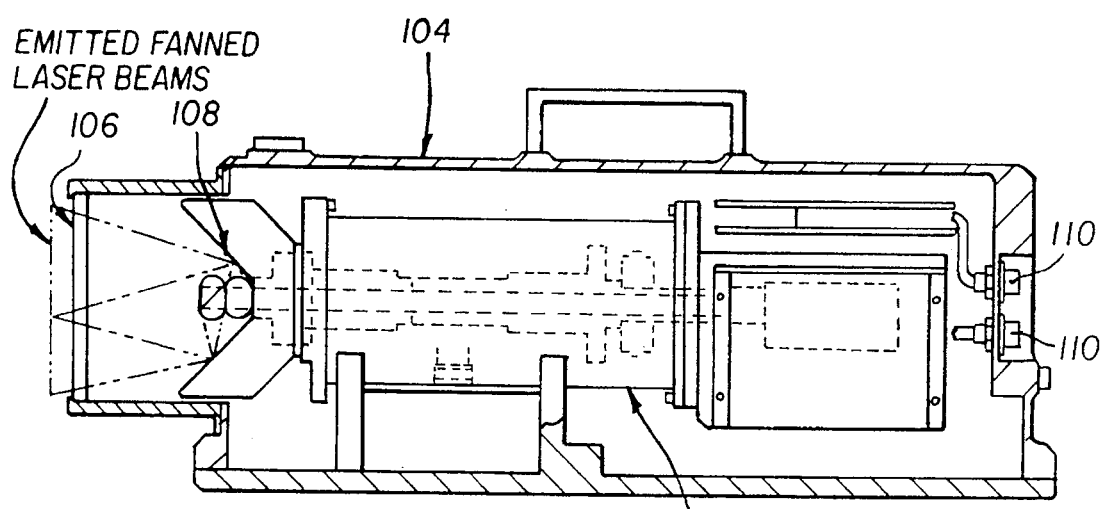
FIG. 5 is a side cut-a-way view of the laser transmitter unit illustrated in FIG. 1.

The laser transmitter unit 100, as illustrated in FIGS. 4 and 5, preferably includes a scanner module 102 provided within a transmitter housing 104 having a preferably cylindrical exit window 106 attached thereto. The center of the cylindrical exit window 106 is aligned with the virtual rotation axis of a spinning prism assembly 108 of the scanner module 102. The exit window 106 is potted into a bezel which is then mounted to the transmitter housing 104 with an o-ring seal. The use of the cylindrical window 106 reduces the size of the housing 104 required for a given sweep angle, and also allows the emitted fanned laser beams to pass through with a minimum amount of beam distortion. The transmitter housing 104 is preferably hermetically sealed utilizing a positive pressure of dry gas (preferably nitrogen), which allows the laser transmitter unit 100 to operate satisfactorily under virtually all weather conditions without fogging or other degradation of performance. Hermetic connectors 110 are used for power and communications interfaces.

Figure 6:
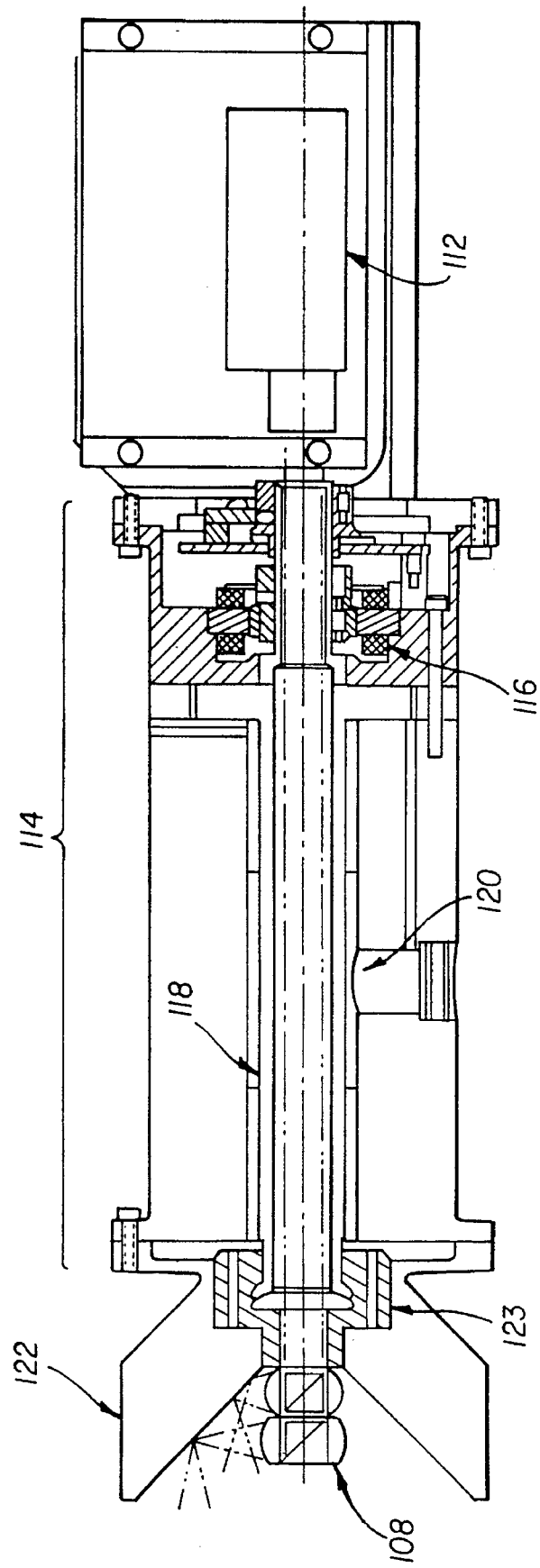
FIG. 6 is a partial cut-a-way view of the scanner module illustrated in FIGS. 4 and 5.

The scanner module 102, as shown in greater detail in FIG. 6, includes a laser emitter 112 coupled to a bearing/motor assembly 114 that drives the scanning rotating prism assembly 108, such that the spin axis of the bearing/motor assembly 114 and the optical axis of the laser emitter 112 are coaxially arranged. The bearing/motor assembly 114 includes a drive motor 116 coupled to a hollow spindle shaft 118 which is supported by a hydrodynamic gas bearing 120. A collimated laser beam, generated by the laser emitter 112, passes through the center of the spindle shaft 118 and into the spinning prism assembly 108, which generates a pair of fanned laser beams. A 90 degree fold mirror 122, preferably a single piece that is kinematically mounted onto the end of the bearing/motor assembly 114 to surround the spinning prism assembly 108, diverts the fanned laser beams out through the cylindrical exit window 106 shown in FIG. 4. Two pairs of counter-rotating fanned output beams are generated by the transmitter unit 100, as the two fanned beams emitted by the prism assembly 108 sweep across a top surface of the fold mirror 122 in one direction to generate the first pair of output beams, and then sweep across a bottom reflective surface of the fold mirror 122 in an opposite direction to generate the second pair of output beams.

The hydrostatic gas bearing 120 provides a near frictionless bearing surface and essentially eliminates cogging torque. In addition, the small clearances and large contact areas inherent in the hydrodynamic bearing 120 design limit susceptibility to damage from handling shock when the unit is not operating, as opposed to traditional ball or roller bearings which suffer from "brinneling" of bearing surfaces when subjected to shock. Brinneling degrades the bearing surface over time and can significantly limit rotational stability.

The scanning prism assembly 108 preferably includes two prism cubes 124, 126, each split at 45 degrees as shown in FIG. 7, that are bonded together one on top of the other. The first prism cube 124 includes a beamsplitter 90 degree fold. The reflected portion of the collimated laser beam received from the spindle shaft 118 exits through a cylindrical lens 128, bonded to a first side of the prism cube 124, which spreads the beam into a fan in one plane to generated a first fanned beam. A dummy cylindrical lens 130 is bonded to a second side of the prism cube 124, opposite to the side having the cylindrical lens 128, to restore balance as shown in FIG. 8. The transmitted portion of the beam then enters the second prism cube 126, which is optically cemented on top of the first prism cube 124, is reflected through a cylindrical lens 132 bonded on a first side of the second prism cube 126 to generate a second fanned beam. A dummy cylindrical lens 134 is also provided on the second prism cube 126 to restore balance. The second prism cube 126 is rotated through an angle phi (preferably, 35 degrees) relative to the first prism cube 124 in the plane in which they are bonded to offset the first fanned beam from the second fanned beam. The first cylindrical lens 128 is rotated an angle gamma (preferably 45 degrees) relative to the axis of rotation in order to slant the second fanned beam with respect to the first fanned beam. The completed scanning prism assembly 108 is cemented and mechanically fixed to a stainless steel mount 123 which is rigidly anchored directly to the hollow spindle shaft 118.

Experimentation has demonstrated that a system using the transmitter units 100 to determine position can function properly using only three emitted fanned laser beams instead of four. Thus, a portion of the 90 degree fold mirror 122 can be made non-reflective, or a different shape can be used, to eliminate one of the beams, preferably a slanted beam, from the output of the transmitter unit 100. The elimination of the slanted beam reduces the amount of timing data which must be processed by the portable receiving unit 200 to determine position.

The modular approach to the transmitter system 100 design effectively removes the transmitter housing 104 from the optical alignment of the system. The scanning module 102 can therefore be independently assembled and aligned prior to installation within the transmitter housing 104, where it is kinematically mounted to a cradle.

The portable receiver unit 200 is preferably configured in a first embodiment, as shown in FIG. 2, to include two optical receivers 500, a processing unit 204, an extension member or rod 203, a tool 205 removably coupled to the rod 203, a communications link 202, and a receiver interface 201. The general interaction and operation of the illustrated components is described in detail in the above referenced U.S. patent application Ser. No. 07/714,891. The illustrated embodiment, however, utilizes the attachment of the processing unit 204 between the two optical receivers 500 to unify the majority of the mass of the receiver system into a single rigid unit.

Alternatively, the portable receiver unit 200 may employ only a single optical receiver 500. Again, the spatial position of the optical receiver 500 is determined as described in prior referenced applications. However, in the implementation illustrated in FIG. 3, the position of the tool 205 is calculated by the processing unit 204 using an mathematical algorithm which projects a vertical line from the optical receiver 500 through the tool 205. In order to determine the position of the tool 205 correctly, the optical receiver 500 must be positioned vertically above, or below, the tool 205. The proper positioning of the optical receiver 500 with respect to the tool 205 is accomplished using a level 205, which indicates to the operator of portable receiver unit 200 when the optical receiver 500 is positioned vertically with respect to the tool 205. This implementation has the advantage of a reducing the processing required to calculate the position of the tool 205. Hence, a lighter, less expensive, less power consumptive processing unit 204 detached from the rod 203 may be employed.

The purpose of the optical receiver 500 is to detect the fan laser beams emitted by the laser transmitter units 100. The position measurement system described in the above patents and applications incorporated by reference employ an optical receiver that can receive light over 360 degrees in azimuth and a more limited angle in elevation. A simple embodiment of a preferred optical receiver 500, shown in FIG. 9, uses a reflective cone 510, a compound parabolic collector (CPC) 501 and a single photodiode detector 503. The reflective cone 510 directs incoming light 504 into the CPC 501. The CPC 501 in turn directs the incoming light of a limited entrance (e.g., +/−10 degrees) onto the photodiode 503. This embodiment of the optical receiver 500 works well in environments where ambient light is at low levels and does not contribute significantly to system noise levels.

Figure 10:
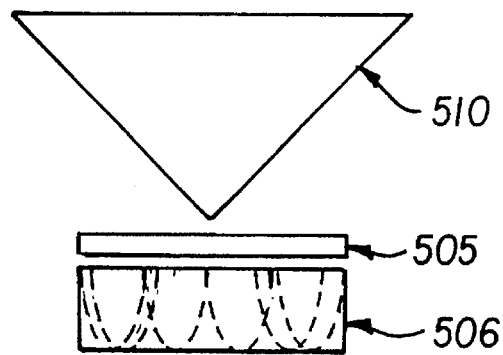
FIG. 10 is a schematic diagram of a second embodiment of an optical receiver.
Figure 11:
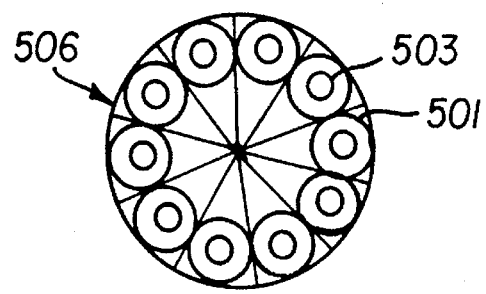
FIG. 11 is a top view of the circular array used in the optical receiver illustrated in FIG. 10.
Figure 12:
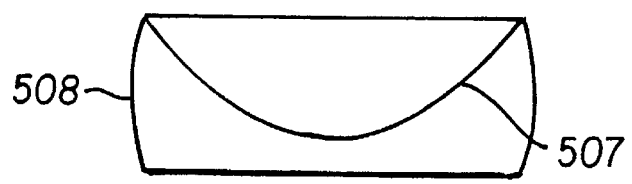
FIG. 12 is a schematic view of a parabolic reflector and spherical lens that can be used to replace the reflective cone in the embodiments illustrated in FIGS. 9 and 10.

If ambient noise is of a level which will begin to degrade range performance (e.g., operation in sunlight), the structure of the optical receiver 500 can be modified to maintain performance. An optical bandpass filter 505, selected to match the wavelength of the emitted fanned laser beams 150, may be placed before the CPC 501. The use of a bandpass filter 505 reduces the level of ambient light entering the CPC 501 and hence increases the signal-to-noise ratio over a similar non-filtered optical receiving system 500. Additionally, multiple photodiodes 503 may be used together in the design to overcome noise from ambient light. A circular array 506 of photodiodes 503 and CPCs 501 may be used to reduce the field of view of any one photodiode and hence reduce the ambient noise as shown in FIGS. 10 and 11. Finally, the reflective cone 510 can also be replaced with a parabolic reflector 507 located within a spherical lens 508 as illustrated in FIG. 12.

Figure 13:
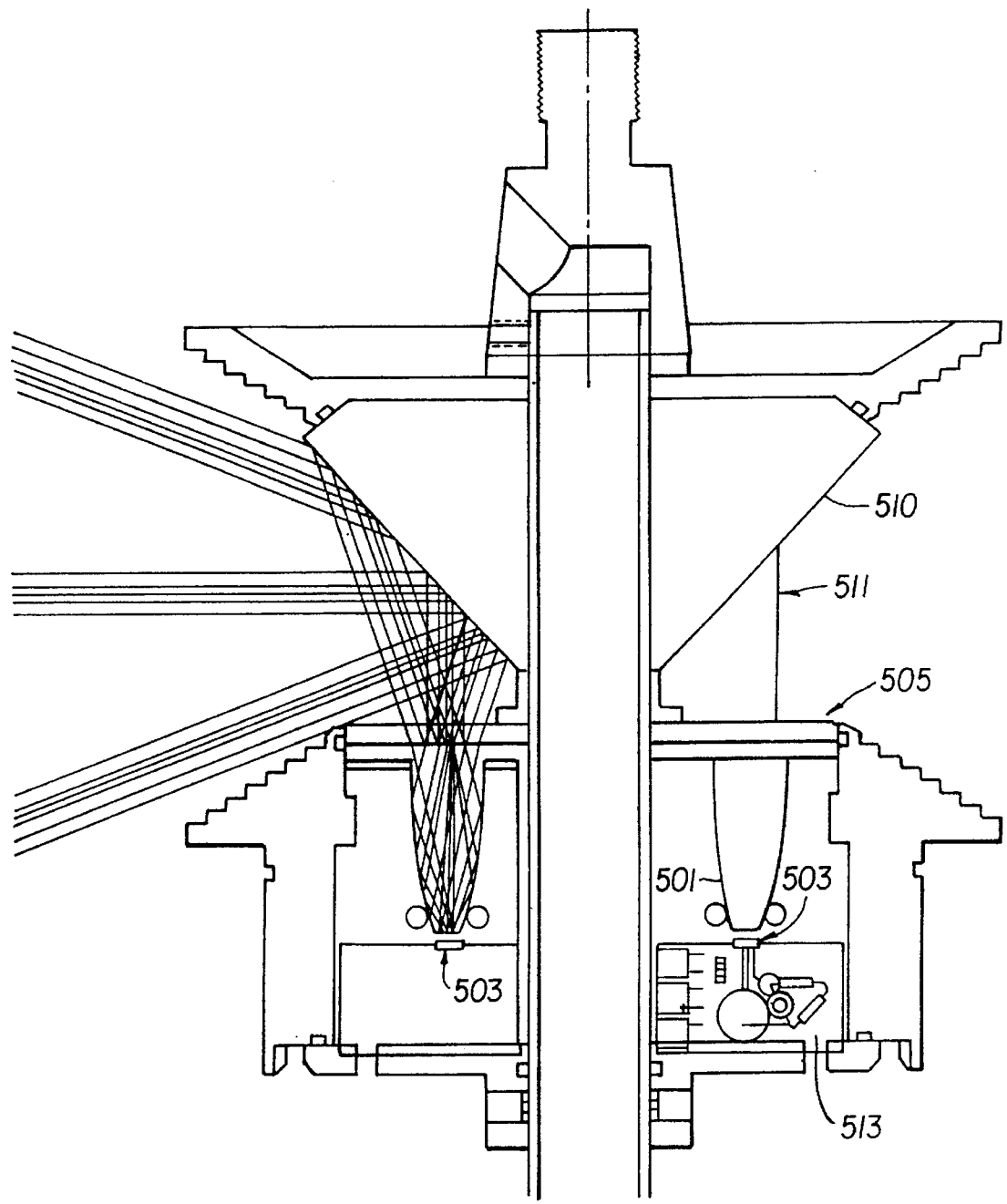
FIG. 13 represents a cross-sectional view of a complete optical receiver.

FIG. 13 illustrates a cross-sectional view of a complete optical receiver 500 that utilizes a circular array of compound parabolic collectors 501, a narrow band width optical filter 505, and array of PIN photodiodes 503, and a reflective cone 510. Reflective plates 511 extending from the reflective cone 510 to the optical filter 505 are also preferably used to reflect light of the received laser beams into the individual CPCs 501 of the circular array. Hence, the reflective plates 511 increase the optical receivers 500 sensitivity and increase the usable range of the portable receiver unit 200.

The array of photodiodes 503 preferably in employs twelve photodiodes, the output of each is coupled to a low noise preamplifier provided on a circuit board 513 located beneath the array. The signal from each preamplifier is supplied to a threshold circuit which has a variable threshold level. The purpose of the threshold circuit is to ensure that only pulses from the preamplifier corresponding to a laser beam striking a segment of the optical receiver are sent to the processing unit 204 for analysis. The threshold is set so that the peaks of electronic noise from the preamplifier do not cross the threshold, and thus false pulses caused by noise are eliminated. The threshold is variable so that under conditions of unusually low noise, for example when the receiver is operated in very low ambient light levels, the threshold can be lowered to increase the sensitivity of the receiver and therefore the measurement range of the system. Under conditions of unusually high noise, for example when sunlight enters directly into a receiver segment, the threshold can be raised to prevent excess noise from that segment from swamping the system with false pulses.

The twelve outputs from the threshold circuits are added together in a summing circuit. This effects an "OR" that any segment of the detector which is hit by a laser beam sends a pulse to the output of the summing circuit. The pulses are then taken to the input of a timing circuit which records the start and end time of each pulse. Under normal operating conditions there will be typically six separate pulses in a given time period, defined by the mean rate of rotation of the output laser beams from the transmitter units 100. The start and end times of the pulses are used to establish the center point of the pulse (i.e. the time at which the center of the pulse was incident upon the optical detector) and then calculate the intervals between pulses, The calculations are performed by the processing unit 204.

The intervals between pulses are used to establish the actual rotation rate of the beams received from each laser transmitter 100 and the relative timing between these beams, as observed by the portable receiver unit 200 at its particular location. The angles subtended by the optical receiver are then calculated and used to compute the position of the portable receiver unit 200 in the appropriate coordinate system.

In alternative implementations of the optical receiver as shown in FIG. 9, only one photodiode is utilized. The single photodiode may receive light pulses from a preferred direction or it may receive light from all directions using suitable optics to direct the light to a single receiver. In these implementations, only one photodiode, preamplifier and threshold circuit are required and there is no summing circuit. The output of the threshold circuit is taken directly to the input of a timing circuit such as described above.

The prior systems disclosed in the above incorporated patents and patent applications utilize portable receiving units that have optical receivers for which receive input from 360 degrees. A portable receiver unit based on an optical telescope that accepts light from one preferred direction, however, can be used to improve the range over which accurate position measurement can be made. The telescope receiver requires a photodiode in place of the conventional eye piece, or by use of a half silvered mirror can incorporate a photodiode which receives part of the light entering the telescope. Additionally, the telescope may be a conventional transit or theodolite or electronic distance measuring device commonly use in surveying.

Figure 14:
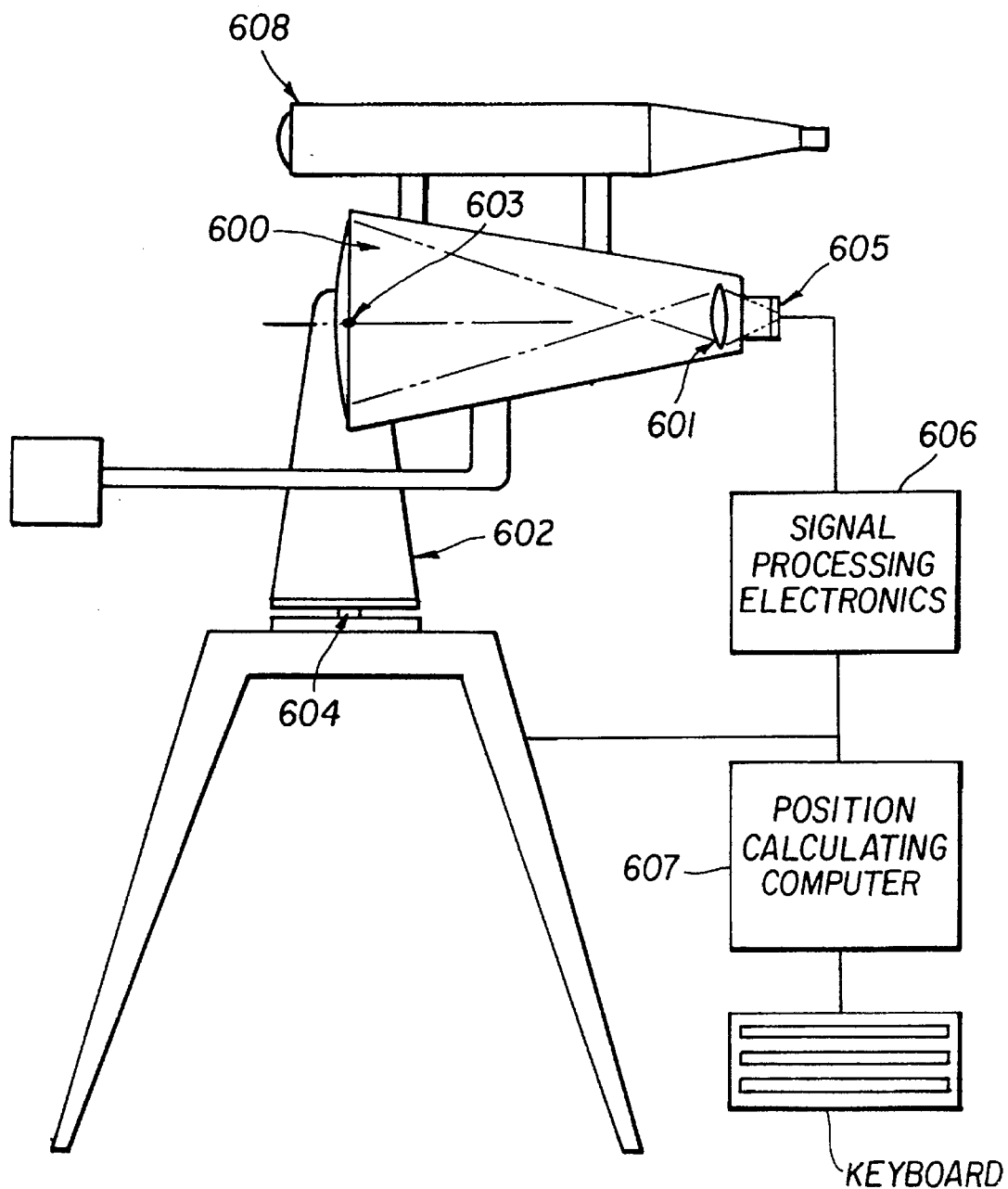
FIG. 14 is a diagram of a telescopic receiver unit.

FIG. 14, for example, illustrates a telescope based receiver mounted that includes a laser signal receiving telescope 600 mounted on a support arm 602 with a horizontal pivot 603 and a vertical pivot 604. The laser signal receiving telescope 600 includes an optical system 601 that focuses incoming radiation onto a photodetector 605. The output of the photodetector 605 is supplied to signal processing electronics 606, similar to the electronics described above, which in turn is coupled to a position calculating computer 607 that calculates the position of the laser signal receiving telescope 600 based on the output signal supplied by the processing electronics 606. An optical targeting telescope 608 is preferably provided to allow the user to properly aim the telescope at a transmitter unit 100.

To perform position location measurements with a telescope based receiver, the telescope 600 is pivoted at one laser transmitter unit 100, and the time of arrival of light from that transmitters rotating beams is recorded. The telescope 600 is then pointed at a second laser transmitter unit 100 and similar recordings are made. The position calculating computer 607, as used in other implementations of prior systems, converts the recorded time arrival of light from each transmitted beam into coordinates for the location of the telescope based receiver.

Figure 15:
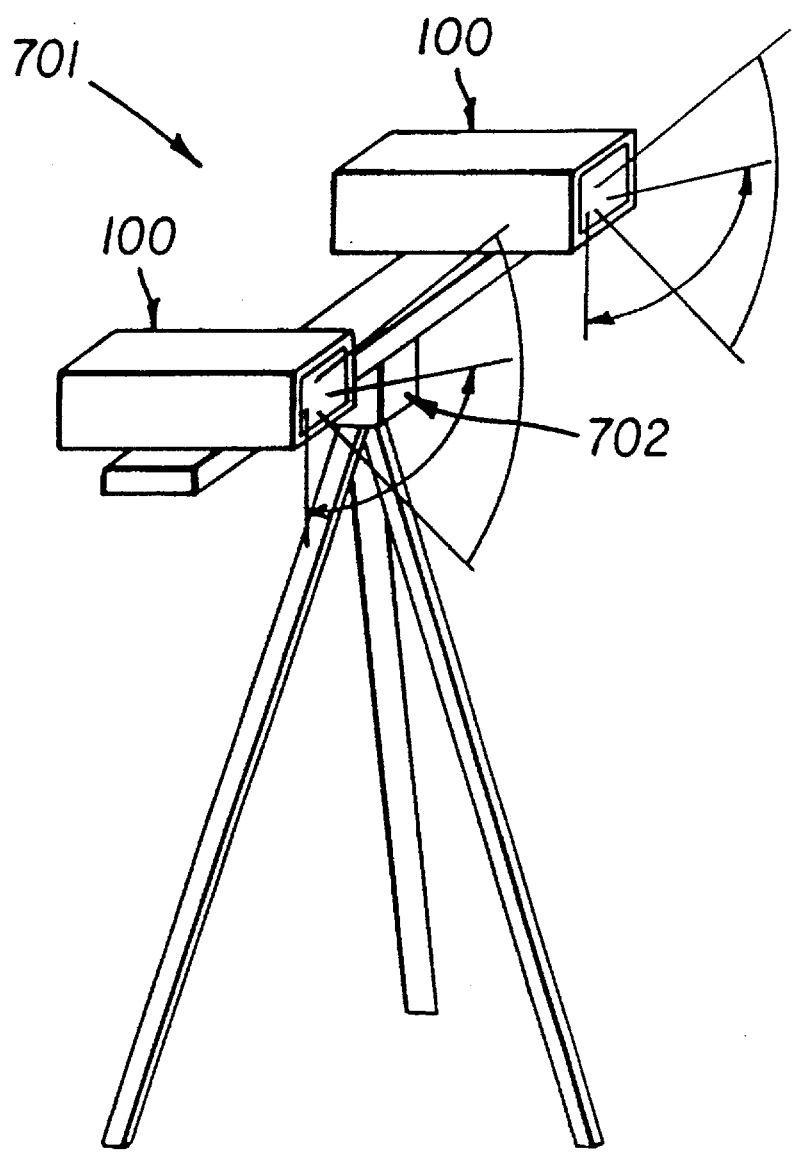
FIG. 15 illustrates the common location of two transmitter units on a rotating device.

As shown in FIG. 15, a variation on the basic systems employing the above-described transmitter units 100 can be implemented using two transmitter units 100 which that rigidly fixed together through a mounting device 701. The mounting device 701 precisely fixes distance between the transmitters 100 and their relative orientation to one another. This implementation eliminates the need for calibration of the position measurement system to determine the relative locations and orientations of the transmitters. Hence, the receiver system 200 may operate immediately to perform position measurement without the initial delay of calibration.

The mounting device 701 is fixed to a rotation device 702 which can be mechanically controlled to turn a specified vertical or horizontal angle, or given a reorientation in the vertical or horizontal angle, the device must be able to measure the turned angles. The system is preferably automatically controlled to turn a specific angle, or at least to turn an angle in a specific direction. The system can also be a manual system whereby an individual can manually turn a horizontal angle and/or a vertical angle and an electronic system will measure and record the turned angle. The measured angles or changes in vertical and horizontal can then be transmitted to a the receiver unit 200. Transmission of this information can be accomplished by manual data transfer and any data transfer mechanism including but not limited to packet radios, and encoded information on the emitted fanned laser beams.

The invention has been described with reference to certain preferred embodiments thereof. It will be understood, however, that modifications and variations are possible within the scope of the appended claims.

What is claimed is:

1. A laser transmitter unit for a spatial measurement system comprising: a laser emitter; a bearing/motor assembly coupled to the laser emitter, the bearing/motor assembly including a rotatable hollow spindle shaft through which a laser beam generated by the laser emitter passes and a motor for driving the spindle shaft; a prism assembly coupled to the spindle shaft, wherein the prism assembly divides the laser beam generated by the laser emitter into a pair of fanned laser beams; and reflecting means for reflecting the fanned laser beams generated by the prism assembly as counter-rotating fanned laser beams.

2. A laser transmitter unit as claimed in claim 1, further comprising a cylindrical exit window through which the fanned laser beams are reflected by the reflecting means.

3. A laser transmitter unit as claimed in claim 1, wherein the reflecting means comprises a 90 degree fold mirror.

4. A laser transmitter unit as claimed in claim 1, wherein the prism assembly includes a first beam splitting prism coupled to a second reflective prism.

5. A laser transmitter unit as claimed in claim 1, wherein a light emitting side of the first beam splitting prism is offset from a light emitting side of the second reflective prism, with respect to an axis of rotation of the prism assembly, by an angle phi.

6. A laser transmitter unit as claimed in claim 5, wherein the light emitting side of the first beam splitting prism and the light emitting side of the reflecting prism each include a cylindrical lens.

7. A laser transmitter unit as claimed in claim 6, wherein the cylindrical lens of the first beam splitting prism is rotated with respect to the cylindrical lens of the second reflecting prism by an angle gamma.

8. A laser transmitter unit as claimed in claim 6, further comprising dummy cylindrical lenses bonded to second sides of the first beam splitting prism and the second reflecting prism opposite to the light emitting sides thereof.

9. A laser transmitter unit as claimed in claim 1, wherein the reflecting means comprises a ninety degree fold mirror.

10. A laser transmitter unit as claimed in claim 1, wherein the bearing/motor assembly includes a hydrodynamic gas bearing.

11. A spatial measurement system comprising: at least two transmitter units and at least one receiver unit, wherein the transmitter units include a laser emitter; a bearing/motor assembly coupled to the laser emitter, the bearing/motor assembly including a rotatable hollow spindle shaft through which a laser beam generated by the laser emitter passes and a motor for driving the spindle shaft; a prism assembly coupled to the spindle shaft, wherein the prism assembly divides the laser beam generated by the laser emitter into a pair of fanned laser beams; and reflecting means for reflecting the fanned laser beams generated by the prism assembly as counter-rotating fanned laser beams; and wherein the receiver unit includes at least one optical receiver coupled to an extension member; a processing unit coupled to the optical receiver; and a receiver interface coupled to the processing unit.

12. A spatial measurement system as claimed in claim 11, wherein at least two transmitter units are commonly mounted on a rotation device.

13. A spatial measurement system as claimed in claim 11, wherein the receiver unit is a telescopic receiver unit.

* * * * *